May 19, 1970     C. W. COLDREN ET AL     3,512,489
PLANTER AND FERTILIZER ATTACHMENT
Filed Feb. 21, 1967
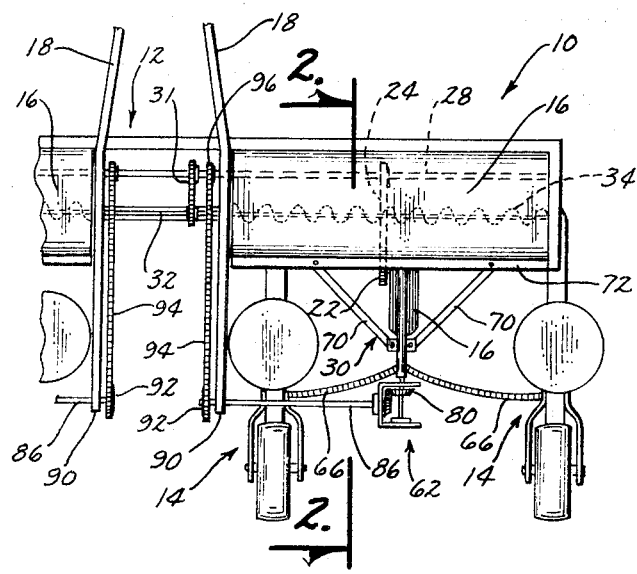
Fig. 1
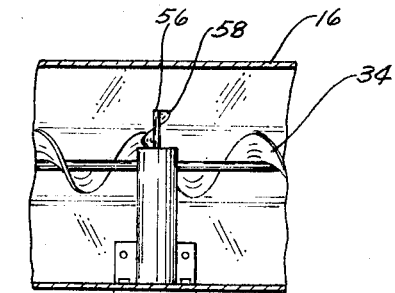
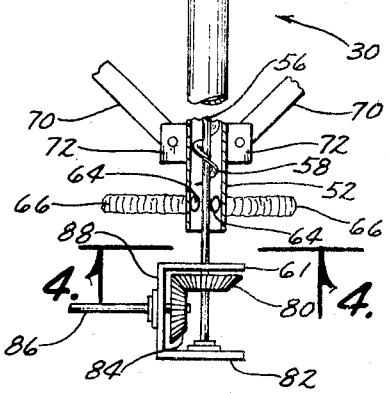
Fig. 3
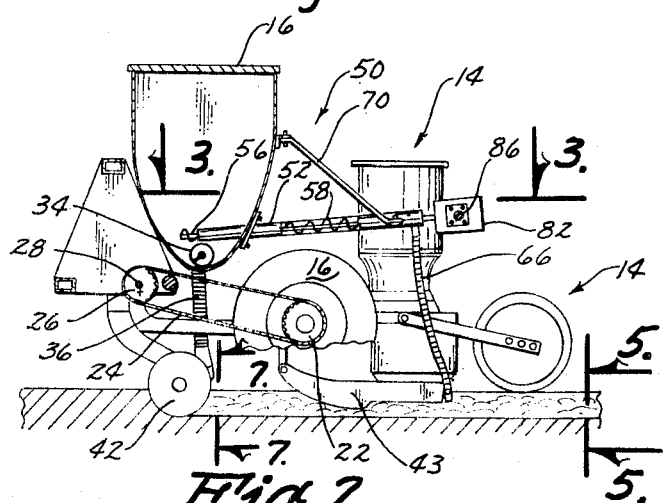
Fig. 2
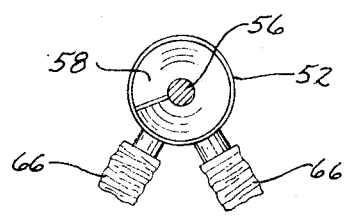
Fig. 4
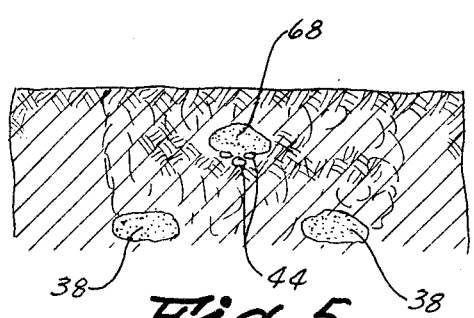
Fig. 5
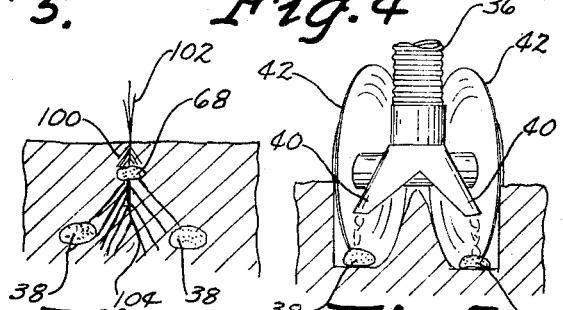
Fig. 6    Fig. 7
INVENTORS
CHARLES W. COLDREN
RICHARD G. HOPKINS
BY
Dich, Zarley, McKee & Thomte
ATTORNEYS

United States Patent Office 3,512,489
Patented May 19, 1970

3,512,489
PLANTER AND FERTILIZER ATTACHMENT
Charles W. Coldren and Richard G. Hopkins, both of Laurens, Iowa 50554
Filed Feb. 21, 1967, Ser. No. 617,534
Int. Cl. A01c 5/08
U.S. Cl. 111—34
4 Claims

ABSTRACT OF THE DISCLOSURE

A corn planter and fertilizer dispensing system wherein an auxiliary fertilizer attachment is provided for supplying fertilizer directly on the planted seed to supplement fertilizer placed below and to the sides of the seed. The auxiliary fertilizer attachment is fed from the fertilizer container on the planter and is driven by the ground support wheel power means. An auger extends from the fertilizer container to a pair of outlet openings in an auger tube which are in communication with flexible conduits extending to the rear ends of seed planting shoes such that the fertilizer from the auxiliary fertilizer attachment is positioned in close proximity to the seed.

---

Planters now include fertilizer attachments which normally place the fertilizer for the deep corn roots at approximately two inches below and two inches to each side of the corn row. This does not help the seed during early growth thus it has been found that by supplying a little bit of fertilizer to the seed the kernels of corn can use the fertilizer immediately upon sprouts appearing. This fertilizer is called "pop-up" fertilizer because the plants seem to pop out of the ground.

Thus this invention involves an auxiliary fertilizer attachment for supplying fertilizer from the main fertilizer container directly to close proximity with the seed in addition to the fertilizer placed in the ground at a deeper level and spaced outwardly to each side. The roots which are formed early will feed off of the "pop-up" fertilizer while the later deeper roots will feed off of the band of fertilizer on each side of the row.

The outlet openings at the discharge end of the auger from the main fertilizer container are so spaced relative to the flighting of the auger that they are supplied with an equal amount of fertilizer for each of the rows to which "pop-up" fertilizer is supplied. This "pop-up" fertilizer attachment may be easily attached to any conventional planter having a fertilizer dispenser.

These and other features and advantages of this invention will become readily apparent to those skilled in the art upon reference to the following description when taken into consideration with the accompanying drawings, wherein:

FIG. 1 is a fragmentary top plan view of the planter of this invention;

FIG. 2 is a cross-sectional elevational view taken along line 2—2 in FIG. 1;

FIG. 3 is a cross-sectional view taken along line 3—3 in FIG. 2;

FIG. 4 is a cross-sectional view taken along line 4—4 in FIG. 3;

FIG. 5 is a cross-sectional view of the ground showing the side band fertilizer and the "pop-up" fertilizer with the seed;

FIG. 6 is a cross-sectional view of the ground after the corn has sprouted and roots have been formed which are feeding off the three sources of fertilizer; and FIG. 7 is a cross-sectional view taken along line 7—7 in FIG. 2.

The planter device of this invention is referred to generally in FIG. 1 by the reference numeral 10 and is shown to include a planter 12 having seed units 14 and ground support power wheels 16.

The forward end of the planter 10 includes a pair of fertilizer containers 16 spaced forwardly of the rearwardly disposed planter units 14. A planter tongue 18 is connected to the planter frame for connection to a leading prime mover vehicle (not shown).

The ground support wheels 16 are mounted on an axle 20 having a sprocket 22 connected by a sprocket chain 24 to a forwardly mounted sprocket wheel 26 mounted on a shaft 28 which through a sprocket and chain 31 drives a shaft 32 extending into each of the fertilizer containers 16. An auger 34 is coupled to each of the ends of the shaft 32 and each of the augers 34 extend the length of the fertilizer container 16.

For each planter unit 14 an outlet conduit 36 extends downwardly as seen in FIGS. 2 and 7 for dispensing fertilizer 38 out of spaced apart outlet spouts 40. A pair of spaced apart disks 42 form a trough in the ground for the fertilizer 38.

A planter unit 14 having a shoe 43 follows the fertilizer disks 42 and drops corn seed 44 as seen in FIG. 5 between and above the side bands of fertilizer 38.

The auxiliary fertilizer attachment is referred to by the reference numeral 50 and includes a length of auger tubing 52 extending through the rear side wall of the fertilizer container 16. The tubing 52 is detachably secured to the fertilizer container by a detachable plate bracket 54. The tube 52 could be removed and a plate placed over the opening in the fertilizer container 16 to close the container. A shaft 56 having auger flighting 58 extends out of the auger tube 52 over the auger 34 in the bottom of the fertilizer container 16. The rearward end of the shaft 56 extends out of the tube 52 through a leg 61 of the U-shaped bracket 62. The flighting on the shaft 56 terminates short of the rearward end of the tube 52 and adjacent a pair of outlet discharge openings 64 in communication with flexible conduits 66 which extend downwardly and are secured to the rear ends of the planter shoes 43 for depositing fertilizer 68 on top of the corn kernels 44.

It is thereby seen that the fertilizer from the container 16 is equally distributed to the outlet openings 64 and the conduits 66. Should additional outlet conduits be desired to feed other planter units, they could also be spaced in the tube in the same plane as the openings 64.

A pair of support brackets 70 extend from the rearward ledge 72 of the fertilizer container 16 downwardly for engagement with the tube 52 through a bracket 72 (FIG. 3).

A bevel gear 80 is mounted on the rearward end of the auger shaft 56 between the bracket leg 61 and the opposite leg 82 and meshes with a gear 84 mounted on a shaft 86 extending through a base portion 88 of the bracket 62. The jack shaft 86 extends transversely of the planter 10 through a support 90 and includes a sprocket wheel 92 mounted on its inner end for engagement with a sprocket chain 94 coupled to a sprocket wheel 96 mounted on the forwardly disposed drive shaft 28.

The planter 10 is a four row planter and the foregoing description refers to the planter units and fertilizer structure for one-half of the machine or for planting and fertilizing two rows. The structure for the other two rows is identical and is referred to by common reference numerals.

In FIGS. 5 and 6, the fertilizer and seed are shown when initially planted and then later after growth of the seed has started. Initially, the "pop-up" fertilizer 68 is closely adjacent to the corn seed 44 and the "pop-up" fertilizer and the seed 44 are spaced above and between the side band fertilizer 38. Thus in FIG. 6 it is seen that the shorter initial roots 100 of the corn feed upon the "pop-up" fertilizer 68 and provide a cornstalk 102 which then forms the longer deeper roots 104 which are drawn downwardly into the ground and feed upon the side band fertilizer 38.

It is believed evident from the foregoing disclosure that the auxiliary "pop-up" fertilizer attachment may be readily attached to any existing planter having a fertilizer dispensing system on it.

Some changes may be made in the construction and arrangement of our planter and fertilizer attachment without departing from the real spirit and purpose of our invention, and it is our intention to cover by our claims, any modified forms of structure or use of mechanical equivalents which may be reasonably included within their scope.

We claim:

1. In combination with a planter device having a frame with forward and rearward ends, a particulate material container on the forward end of said frame having a front and a rear side, at least one seed planting unit on the rearward end of said frame substantially spaced behind said material container, a ground engaging seed planting shoe mans on said seed planting unit whereby seed is transmitted from said planting unit into the ground, a power means on said frame and operatively connected to said seed planting unit for depositing seed therefrom into the ground, said power means adapted to be connected to a source of rotational power, and a single tubular auger housing extending from the rear side of said container, and being in communication with the bottom interior of said container, a shaft within said tubular auger housing and extending from the bottom interior of said container and having a portion extending to a point rearwardly of the rearward end of said tubular auger housing, said tubular auger housing having at least one lateral discharge port adjacent its rearward end, auger flighting on said shaft and extending from the bottom interior of said container into said tubular auger housing towards said discharge port, means connecting said shaft portion extending beyond the rearward end of said auger housing to said power means, a flexible conduit extending from said port in said tubular auger housing operatively to said seed planting shoe means whereby a quantity of particulate material can be deposited in the ground, a gear means is mounted on the rearward end portion of said shaft, a jack shaft is rotatably mounted on said frame and extending laterally thereacross and being operatively connected to said power means, and a gear means is positioned on said jack shaft in mesh with the gear means on the rearward end of said shaft, a U-shaped bracket has a base portion, a forward leg portion and a rearward leg portion, said shaft extending through and being rotatably supported by said forward and rearward leg portions, one end of said jack shaft extending through the base portion of said U-shaped bracket, said gear means on said shaft and said jack shaft being in mesh within said U-shaped bracket.

2. In combination with a planter device having a frame with forward and rearward ends, a particulate material container on the forward end of said frame having a front and a rear side, at least one seed planting unit on the rearward end of said frame substantially spaced behind said material container, a ground engaging seed planting shoe means on said seed planting unit whereby seed is transmitted from said planting unit into the ground, a power means on said frame and operatively connected to said seed planting unit for depositing seed therefrom into the ground, said power means adapted to be connected to a source of rotational power, and a single tubular auger housing extending from the rear side of said container, and being in communication with the bottom interior of said container, a shaft within said tubular auger housing and extending from the bottom interior of said container and having a portion extending to a point rearwardly of the rearward end of said tubular auger housing, said tubular auger housing having at least one lateral discharge port adjacent its rearward end, auger flighting on said shaft and extending from the bottom interior of said container into said tubular auger housing towards said discharge port, means connecting said shaft portion extending beyond the rearward end of said auger housing to said power means, a flexible conduit extending from said port in said tubular auger housing operatively to said seed planting shoe means whereby a quantity of particulate material can be deposited in the ground, said container is a fertilizer container and said flexible conduit is positioned to extend to the rearward end of said seed planter shoe such that a quantity of fertilizer can be deposited directly on or with seed deposited in the ground through said seed planting shoe, a ground engaging fertilizer shoe means is positioned forwardly of said seed planting shoe means and in communication with said fertilizer container whereby fertilizer is transmitted from said fertilizer container to the ground, said fertilizer shoe means having at least one exit port positioned at one side of the line of travel of the seed planting shoe means therebehind and being at a greater depth than said seed planting shoe whereby a quantity of fertilizer can be deposited in the ground below and to at least one side of seed subsequently planted through said rearwardly positioned seed planting shoe means, said power means on said frame also being operatively connected to said fertilizer container for depositing fertilizer therefrom into the ground.

3. The structure of claim 2 wherein said planter unit is one of a pair of planter units, and a ground engaging fertilizer shoe means is positioned forwardly of said other planter unit in said pair of planter units and is in communication with said fertilizer container, and said exit port being one of a pair of exit ports positioned on opposite sides of the line of travel of the seed planting shoe means whereby a quantity of fertilizer is deposited in the ground on each side of seed being planted.

4. The structure of claim 2 wherein said discharge port in said auger housing is one of a pair of discharge ports adjacent the rearward end of said housing and being in the same transverse plane and an equal distance from a longitudinal vertical plane through the center of said housing to assure equal volume flow of fertilizer through each port, a flexible conduit extending from said other port to said other planter unit at the rearward end of its seed planting shoe for dropping fertilizer directly on seed deposits in the ground through said other planter unit shoe.

References Cited

UNITED STATES PATENTS

| 564,181 | 7/1896 | Bering | 111—34 |
|---|---|---|---|
| 814,809 | 3/1906 | Shelly. | |
| 2,222,015 | 11/1940 | Bateman | 111—80 |
| 2,713,836 | 7/1955 | Ajero | 111—80 |
| 2,936,726 | 5/1960 | Gandrud | 111—80 |
| 3,252,630 | 5/1966 | Berg | 222—413 X |

ROBERT E. BAGWILL, Primary Examiner

A. E. KOPECKI, Assistant Examiner

U.S. Cl. X.R.

111—80; 222—413